(12) United States Patent
Huang

(10) Patent No.: US 8,225,513 B2
(45) Date of Patent: Jul. 24, 2012

(54) GARDENING SHEARS HAVING ENERGY-SAVING FUNCTION

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 304 days.

(21) Appl. No.: 12/715,687

(22) Filed: Mar. 2, 2010

(65) Prior Publication Data

US 2011/0214293 A1 Sep. 8, 2011

(51) Int. Cl.
*B26B 13/00* (2006.01)
*B26B 17/00* (2006.01)

(52) U.S. Cl. ............... 30/254; 30/190; 30/192; 30/245; 30/251

(58) Field of Classification Search ............ 30/190, 30/192, 244, 245, 249–251, 254; D8/5
See application file for complete search history.

(56) References Cited

U.S. PATENT DOCUMENTS

| | | | | | |
|---|---|---|---|---|---|
| 25,140 | A | * | 8/1859 | Roome | 30/251 |
| 103,197 | A | * | 5/1870 | Kellogg | 30/254 |
| 488,959 | A | * | 12/1892 | Brandenburg | 30/250 |
| 1,065,753 | A | * | 6/1913 | Whitney | 30/250 |
| 1,204,482 | A | * | 11/1916 | Parker | 30/251 |
| 1,368,244 | A | * | 2/1921 | Desrochers | 30/251 |
| 1,577,140 | A | * | 3/1926 | Mitchell | 30/250 |
| 2,512,334 | A | * | 6/1950 | Johnson | 30/251 |
| 2,816,359 | A | * | 12/1957 | Hogue et al. | 30/250 |
| 3,851,389 | A | * | 12/1974 | Swanson | 30/250 |
| 4,178,682 | A | * | 12/1979 | Sadauskas | 30/250 |
| 4,980,975 | A | * | 1/1991 | Hodson | D8/5 |
| 5,159,757 | A | * | 11/1992 | Weid et al. | 30/251 |
| 5,325,591 | A | * | 7/1994 | Orthey | 30/250 |
| 5,689,888 | A | * | 11/1997 | Linden | 30/250 |
| 5,809,654 | A | * | 9/1998 | Huang | 30/250 |
| D401,485 | S | * | 11/1998 | Liao | D8/5 |
| 5,970,617 | A | * | 10/1999 | Chang | 30/249 |
| D434,286 | S | * | 11/2000 | Lin | D8/5 |
| D437,751 | S | * | 2/2001 | Lin | D8/5 |
| 6,345,446 | B1 | * | 2/2002 | Huang | 30/250 |
| D464,854 | S | * | 10/2002 | Lai | D8/5 |
| D479,960 | S | * | 9/2003 | Huang | D8/5 |
| D481,273 | S | * | 10/2003 | Huang | D8/5 |
| 6,681,492 | B1 | * | 1/2004 | Huang | 30/250 |
| D497,784 | S | * | 11/2004 | Picaza | D8/5 |
| 6,829,829 | B1 | * | 12/2004 | Huang | 30/245 |
| 7,530,172 | B1 | * | 5/2009 | Wu | 30/244 |
| 7,640,666 | B1 | * | 1/2010 | Huang | 30/254 |

(Continued)

FOREIGN PATENT DOCUMENTS

GB 2444912 A * 6/2008

(Continued)

*Primary Examiner* — Jason Daniel Prone
(74) *Attorney, Agent, or Firm* — Alan Kamrath; Kamrath IP Lawfirm, PA

(57) ABSTRACT

A pair of gardening shears include a main cutter, a secondary cutter pivotally connected with the main cutter, a force arm pivotally connected with the main cutter and engaged with the secondary cutter to drive the secondary cutter to pivot relative to the main cutter, and a connecting plate mounted on the secondary cutter and the force arm. Thus, the secondary cutter and the force arm are sandwiched between the main cutter and the connecting plate so that the secondary cutter and the force arm are moved smoothly and stably by limit of the main cutter and the connecting plate so as to facilitate the user performing the pruning action.

3 Claims, 12 Drawing Sheets

U.S. PATENT DOCUMENTS

| | | | |
|---|---|---|---|
| 7,810,242 B1 * | 10/2010 | Lynch | 30/254 |
| D634,594 S * | 3/2011 | Huang | D8/5 |
| D634,993 S * | 3/2011 | Huang | D8/5 |
| D634,994 S * | 3/2011 | Huang | D8/5 |
| D634,995 S * | 3/2011 | Huang | D8/5 |
| D638,674 S * | 5/2011 | Huang | D8/5 |
| D638,675 S * | 5/2011 | Huang | D8/5 |
| D638,676 S * | 5/2011 | Huang | D8/5 |
| D638,677 S * | 5/2011 | Huang | D8/5 |
| 7,946,039 B2 * | 5/2011 | Erbrick | 30/251 |
| 8,024,864 B2 * | 9/2011 | Mortensen | 30/250 |
| 8,166,659 B2 * | 5/2012 | Huang | 30/254 |
| 2003/0106223 A1 * | 6/2003 | Lee | 30/249 |
| 2003/0136008 A1 * | 7/2003 | Lin | 30/250 |
| 2009/0293288 A1 * | 12/2009 | Hernandez | 30/251 |
| 2010/0043238 A1 * | 2/2010 | Linden et al. | 30/251 |
| 2010/0269357 A1 * | 10/2010 | Shan | 30/254 |
| 2011/0214293 A1 * | 9/2011 | Huang | 30/251 |
| 2012/0017445 A1 * | 1/2012 | Huang | 30/192 |
| 2012/0060377 A1 * | 3/2012 | Huang | 30/244 |

FOREIGN PATENT DOCUMENTS

| | | | |
|---|---|---|---|
| GB | 2459449 A | * | 10/2009 |
| GB | 2466358 A | * | 6/2010 |
| JP | 52024396 A | * | 2/1977 |

\* cited by examiner

GARDENING SHEARS HAVING ENERGY-SAVING FUNCTION

BACKGROUND OF THE INVENTION

1. Field of the Invention

The present invention relates to a gardening cutting tool and, more particularly, to a pair of gardening shears for shearing a plant.

2. Description of the Related Art

A gardening cutting tool, such as a pair of gardening shears, is used to cut or shear a plant, such as the branches of a tree, in an energy-saving manner, thereby facilitating a user operating the gardening cutting tool. A pair of conventional gardening shears in accordance with the prior art shown in FIGS. 11 and 12 comprise a metallic plate 50, a first elongate member 60 and a second elongate member 70. The metallic plate 50 has a first end provided with a first cutting portion 52, a mediate portion provided with a first pivot member 51 and a second end 53 provided with a second pivot member 54 spaced from the first pivot member 51. The first elongate member 60 is pivotally connected with the first pivot member 51 of the metallic plate 50 and has a first end provided with a second cutting portion 61 that is movable relative to the first cutting portion 52 of the metallic plate 50, a mediate portion provided with a first sector gear portion 63 and a second end provided with a first extension 62. The second elongate member 70 is pivotally connected with the second pivot member 54 of the metallic plate 50 and has a first end provided with a second sector gear portion 72 meshing with the first sector gear portion 63 of the first elongate member 60 and a second end provided with a second extension 71.

In operation, the second sector gear portion 72 of the second elongate member 70 meshes with the first sector gear portion 63 of the first elongate member 60 so that when the second elongate member 70 is pivoted relative to the first elongate member 60, the metallic plate 50 is driven by the second elongate member 70 to pivot relative to the first elongate member 60, and the first cutting portion 52 of the metallic plate 50 is moved relative to the second cutting portion 61 of the first elongate member 60. Thus, the first cutting portion 52 of the metallic plate 50 is moved relative to the second cutting portion 61 of the first elongate member 60 from the opened position as shown in FIG. 12 to the closed position as shown in FIG. 11 to perform a cutting or shearing action so as to cut or prune a plant, such as the branches of a tree, and the like.

However, the first elongate member 60 and the second elongate member 70 are mounted on one side of the metallic plate 50 so that when the first elongate member 60 and the second elongate member 70 are subjected to a reaction during the cutting process, the reaction is easily concentrated on the meshing portion of the first elongate member 60 and the second elongate member 70, thereby interrupting operation of the first elongate member 60 and the second elongate member 70, and thereby wasting the user's time and energy.

BRIEF SUMMARY OF THE INVENTION

In accordance with the present invention, there is provided a main cutter, a secondary cutter pivotally connected with the main cutter, a force arm pivotally connected with the main cutter and engaged with the secondary cutter to drive the secondary cutter to pivot relative to the main cutter, and a connecting plate mounted on the secondary cutter and the force arm so that the secondary cutter and the force arm are sandwiched between the main cutter and the connecting plate.

The primary objective of the present invention is to provide a pair of gardening shears having an energy-saving function.

According to the primary objective of the present invention, the secondary cutter and the force arm are sandwiched between the main cutter and the connecting plate so that the secondary cutter and the force arm are moved smoothly and stably by limit of the main cutter and the connecting plate to facilitate the user performing the pruning action.

According to another objective of the present invention, the secondary cutter and the force arm are connected by the connecting plate so that when the main cutter and the secondary cutter perform the cutting action, the reaction applied on the main cutter and the secondary cutter is distributed by the force arm evenly to prevent from incurring a stress concentration on the main cutter and the secondary cutter so as to facilitate operation and movement of the main cutter and the secondary cutter.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
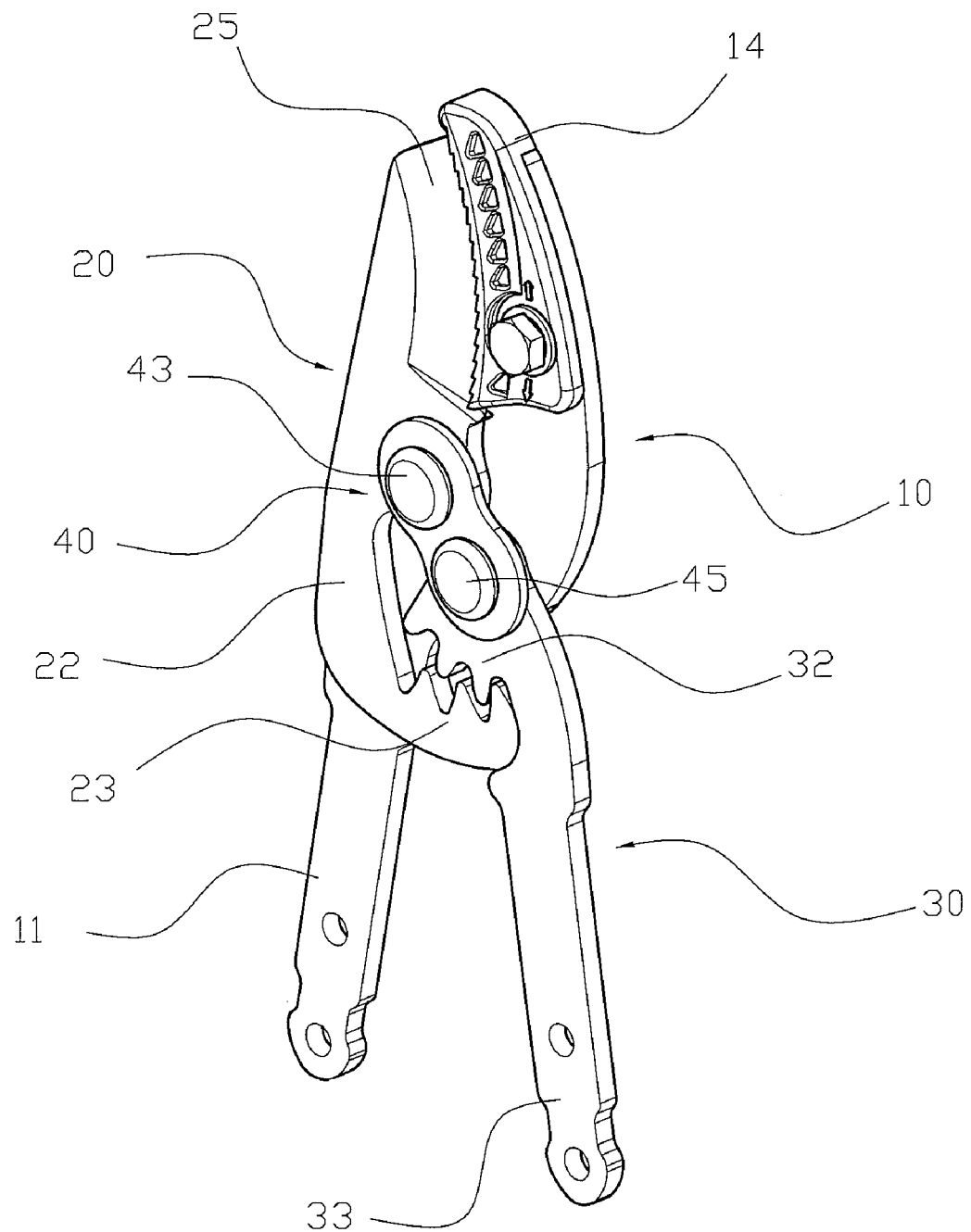
FIG. 1 is a perspective view of a pair of gardening shears in accordance with the preferred embodiment of the present invention.
Figure 2:
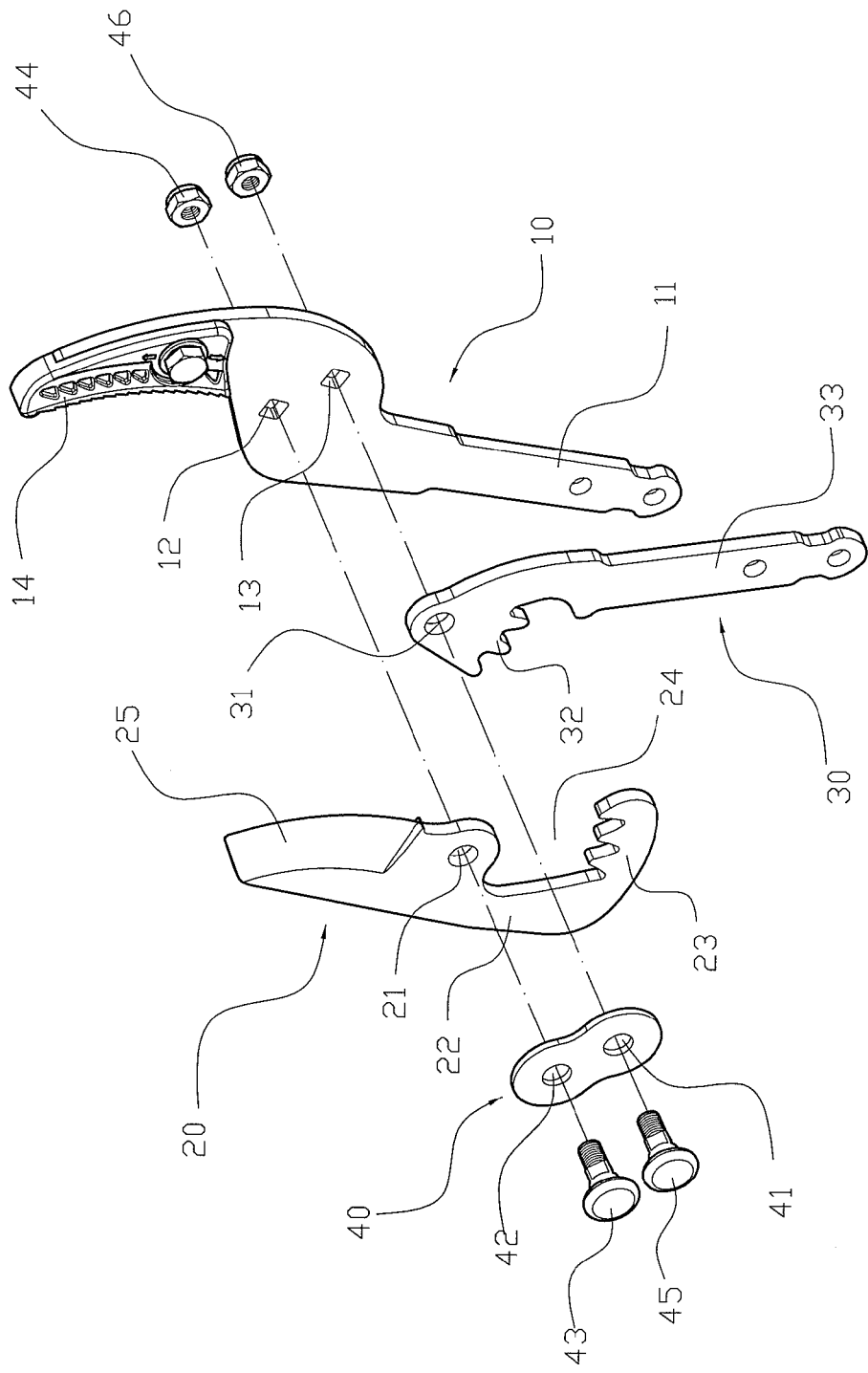
FIG. 2 is an exploded perspective view of the gardening shears as shown in FIG. 1.
Figure 3:
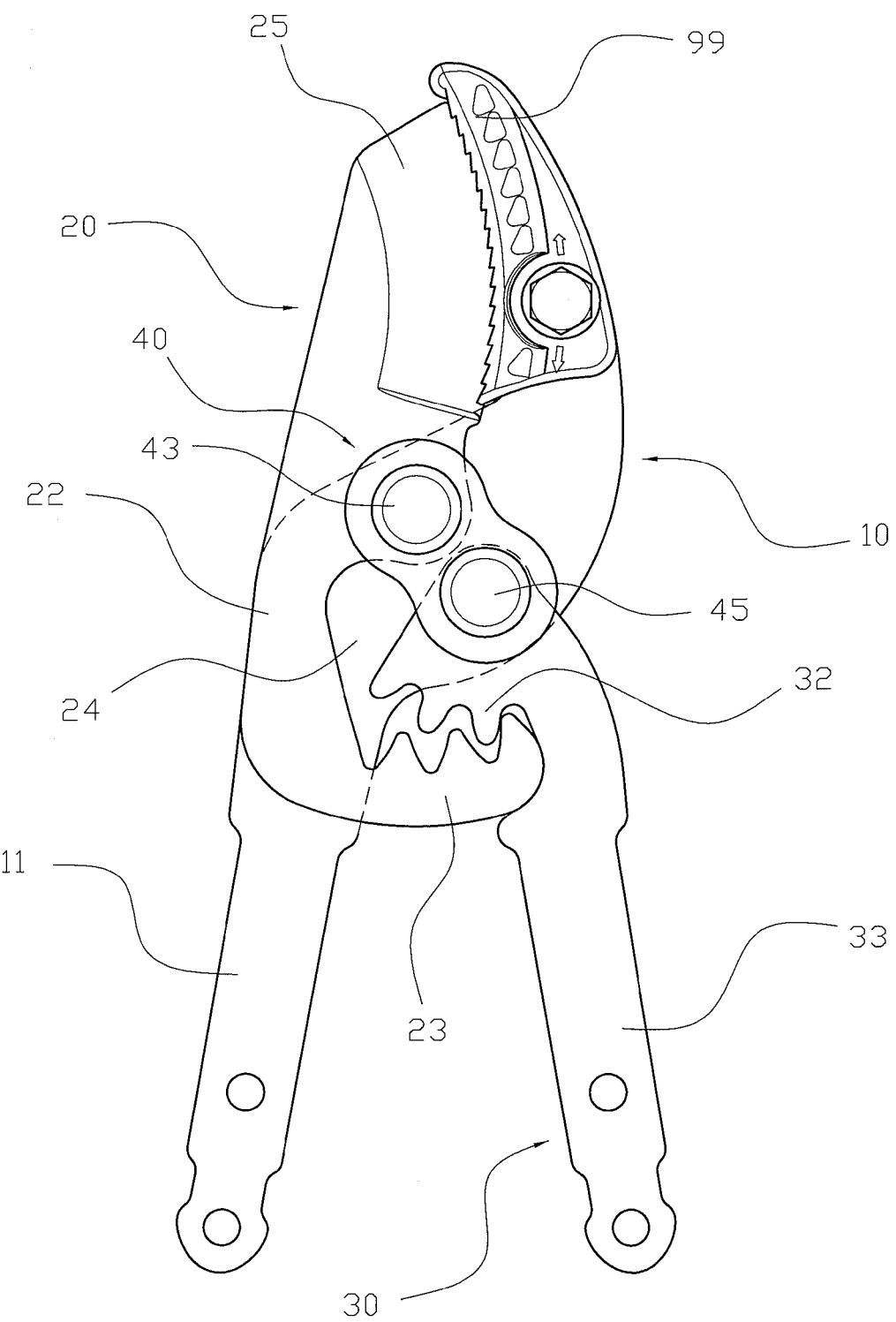
FIG. 3 is a front view of the gardening shears as shown in FIG. 1.
Figure 4:
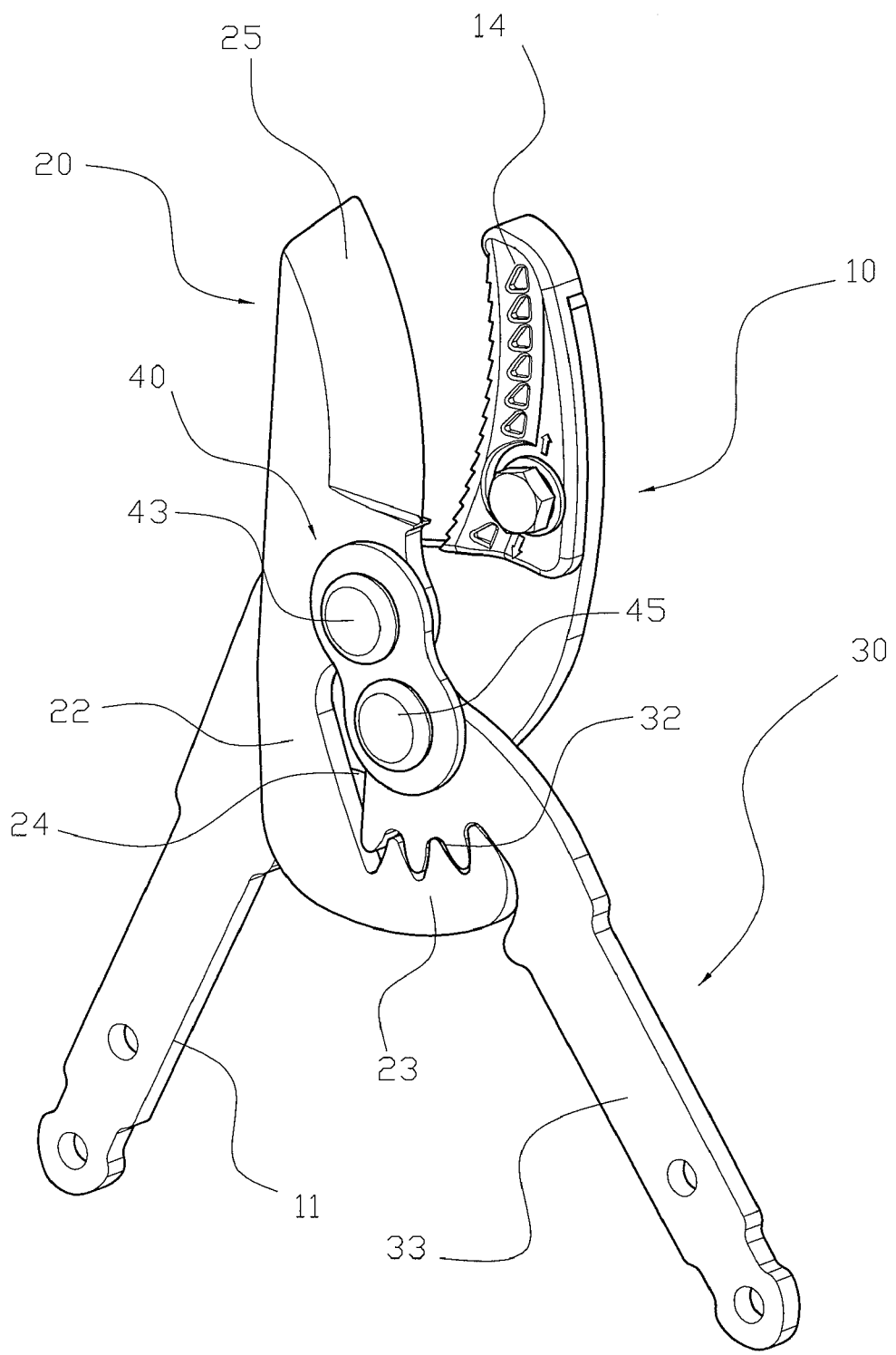
FIG. 4 is a schematic operational view of the gardening shears as shown in FIG. 1.
Figure 5:
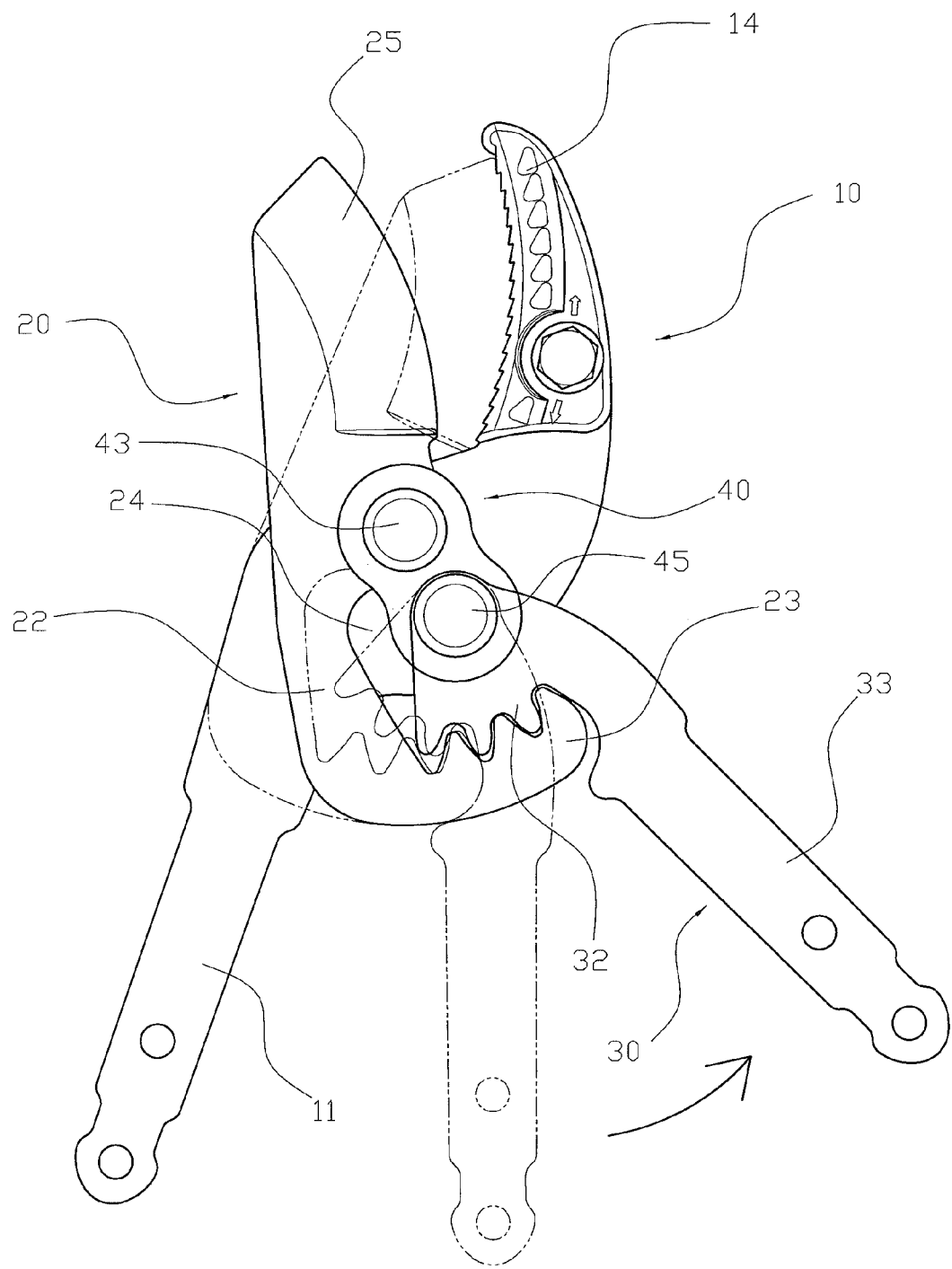
FIG. 5 is a schematic operational view of the gardening shears as shown in FIG. 3.
Figure 6:
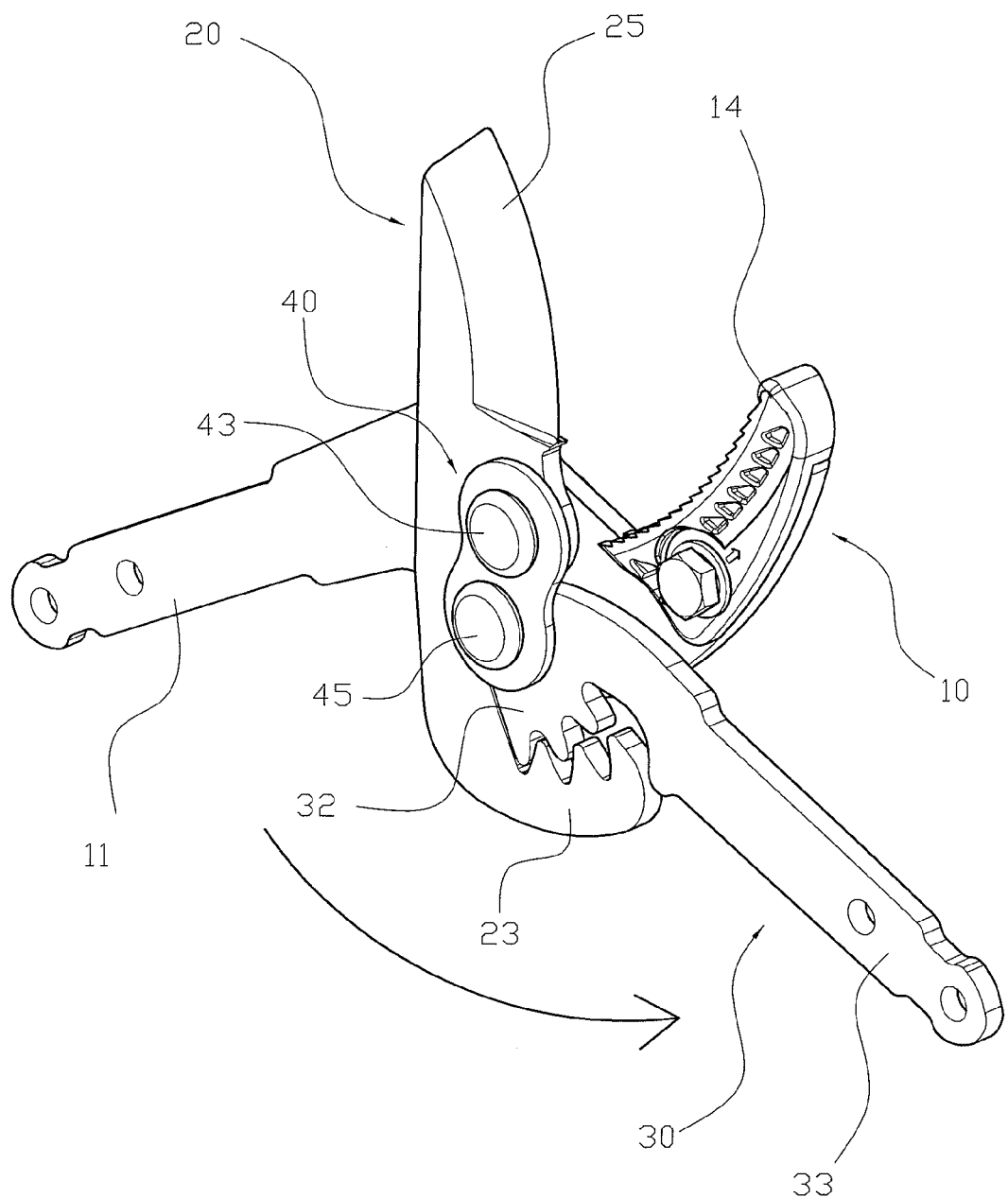
FIG. 6 is a schematic operational view of the gardening shears as shown in FIG. 4.
Figure 7:
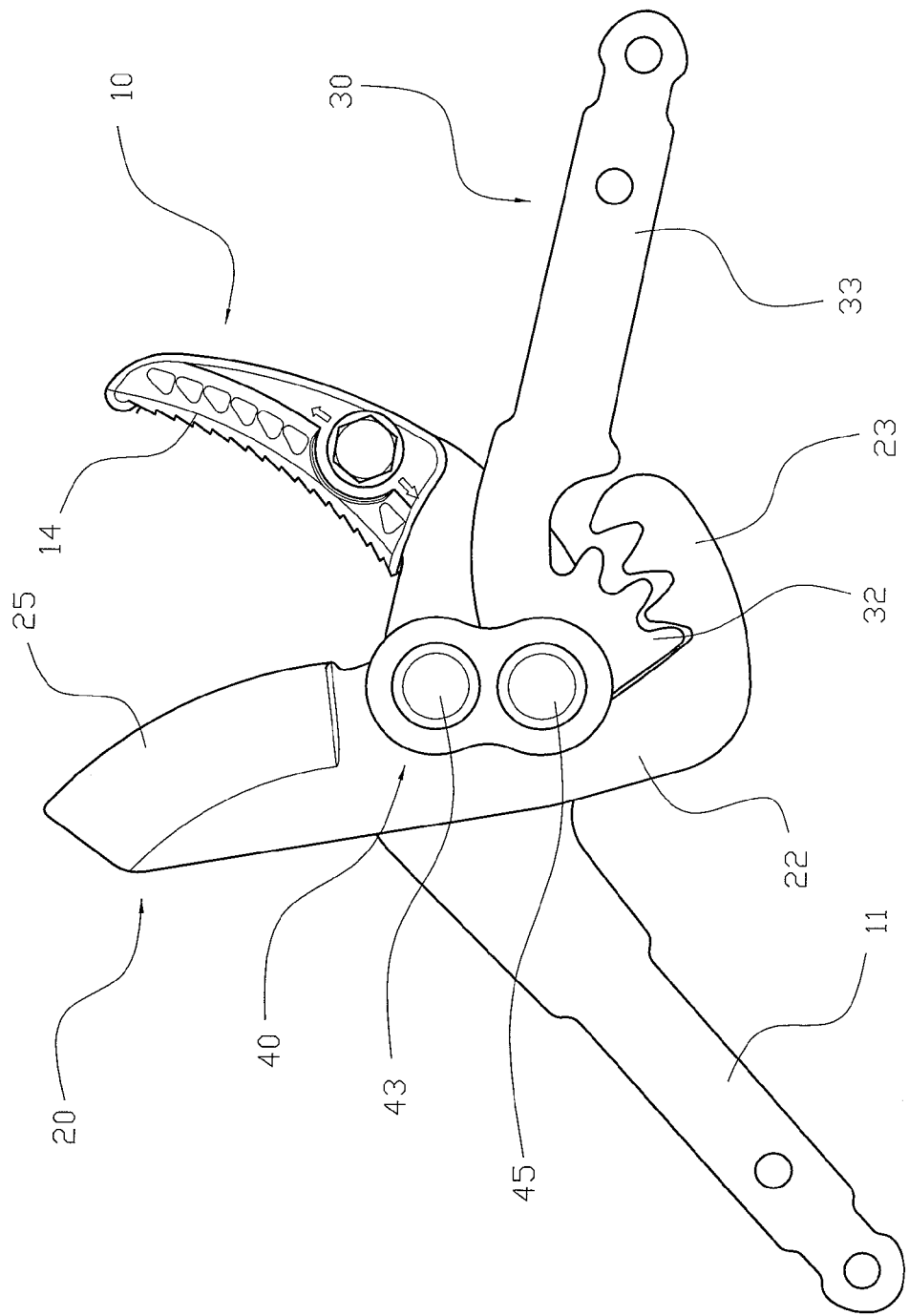
FIG. 7 is a schematic operational view of the gardening shears as shown in FIG. 5.

Referring to the drawings and initially to FIGS. 1-3, a pair of gardening shears in accordance with the preferred embodiment of the present invention comprise a main cutter 10, a secondary cutter 20 pivotally connected with the main cutter 10, a force arm 30 pivotally connected with the main cutter 10 and engaged with the secondary cutter 20 to drive the secondary cutter 20 to pivot relative to the main cutter 10, and a connecting plate 40 mounted on the secondary cutter 20 and the force arm 30 so that the secondary cutter 20 and the force arm 30 are sandwiched between the main cutter 10 and the connecting plate 40.

The main cutter 10 has a first end provided with a first handle 11 and a second end provided with a first cutting portion 14. Preferably, the first cutting portion 14 of the main cutter 10 is a blade or an anvil. The main cutter 10 has a mediate portion provided with a first pivot hole 12 and a first pivot bore 13. The first pivot bore 13 of the main cutter 10 is located beneath the first pivot hole 12 of the main cutter 10.

The secondary cutter 20 is a sheet plate abutting the main cutter 10. The secondary cutter 20 has a middle portion provided with a second pivot hole 21 which is pivotally connected with the first pivot hole 12 of the main cutter 10 by a first pivot bolt 43 and a first fastening nut 44. The secondary cutter 20 has a first end provided with an elongate extension 22 and a second end provided with a second cutting portion 25 which faces the first cutting portion 14 of the main cutter 10. Preferably, the second cutting portion 25 of the secondary cutter 20 is a blade or an anvil. The extension 22 of the secondary cutter 20 has a bent distal end provided with a driven gear portion 23. The driven gear portion 23 of the secondary cutter 20 is perpendicular to the extension 22 of the secondary cutter 20. The first end of the secondary cutter 20 has a side provided with a receiving space 24 which is defined between the second pivot hole 21, the extension 22 and the driven gear portion 23 of the secondary cutter 20. The receiving space 24 of the secondary cutter 20 has a substantially U-shaped profile to form a substantially U-shaped opening.

The force arm 30 is a sheet plate abutting the main cutter 10 and juxtaposed to the secondary cutter 20. The force arm 30 has a first end provided with a second handle 33 which faces the first handle 11 of the main cutter 10 and a second end provided with a second pivot bore 31 which is pivotally connected with the first pivot bore 13 of the main cutter 10 by a second pivot bolt 45 and a second fastening nut 46. The second end of the force arm 30 has a side provided with a drive gear portion 32 meshing with the driven gear portion 23 of the secondary cutter 20 so that the secondary cutter 20 is driven by the force arm 30 to pivot relative to the main cutter 10 when the force arm 30 is pivoted relative to the main cutter 10. The drive gear portion 32 of the force arm 30 is located under the second pivot bore 31 of the force arm 30 and is movable in the receiving space 24 of the secondary cutter 20.

The connecting plate 40 is a substantially oblong sheet plate abutting the secondary cutter 20 and the force arm 30 so that the secondary cutter 20 and the force arm 30 are connected by the connecting plate 40. The connecting plate 40 has a first end provided with a first through hole 42 which is mounted on the first pivot bolt 43 and a second end provided with a second through hole 41 which is mounted on the second pivot bolt 45. The first end of the connecting plate 40 abuts the secondary cutter 20, and the second end of the connecting plate 40 abuts the force arm 30.

The first pivot bolt 43 in turn extends through the first through hole 42 of the connecting plate 40, the second pivot hole 21 of the secondary cutter 20 and the first pivot hole 12 of the main cutter 10, and the first fastening nut 44 is screwed onto the first pivot bolt 43. Thus, the secondary cutter 20 is pivotable about the first pivot bolt 43.

The second pivot bolt 45 in turn extends through the second through hole 41 of the connecting plate 40, the second pivot bore 31 of the force arm 30 and the first pivot bore 13 of the main cutter 10, and the second fastening nut 46 is screwed onto the second pivot bolt 45. Thus, the force arm 30 is pivotable about the second pivot bolt 45.

In operation, referring to FIGS. 3-7 with reference to FIGS. 1 and 2, the drive gear portion 32 of the force arm 30 meshes with the driven gear portion 23 of the secondary cutter 20 so that when the force arm 30 is pivoted relative to the main cutter 10, the secondary cutter 20 is driven by the force arm 30 to pivot relative to the main cutter 10. At this time, the secondary cutter 20 is pivoted about the first pivot bolt 43, and the force arm 30 is pivoted about the second pivot bolt 45.

In such a manner, when the force arm 30 is pivoted outward relative to the main cutter 10, the secondary cutter 20 is driven by the force arm 30 to pivot outward relative to the main cutter 10 and to move from the closed position as shown in FIGS. 1 and 3 to the opened position as shown in FIGS. 4-7, so that the second cutting portion 25 of the secondary cutter 20 is moved outward relative to the first cutting portion 14 of the main cutter 10.

On the contrary, when the force arm 30 is pivoted toward the main cutter 10, the secondary cutter 20 is driven by the force arm 30 to pivot toward the main cutter 10 and to move from the opened position as shown in FIGS. 4-7 to the closed position as shown in FIGS. 1 and 3, so that the second cutting portion 25 of the secondary cutter 20 is moved toward the first cutting portion 14 of the main cutter 10 to perform a cutting or shearing action so as to cut or prune a plant and the like.

As shown in FIG. 1, the first cutting portion 14 of the main cutter 10 is an anvil, and the second cutting portion 25 of the secondary cutter 20 is a blade.

Figure 8:
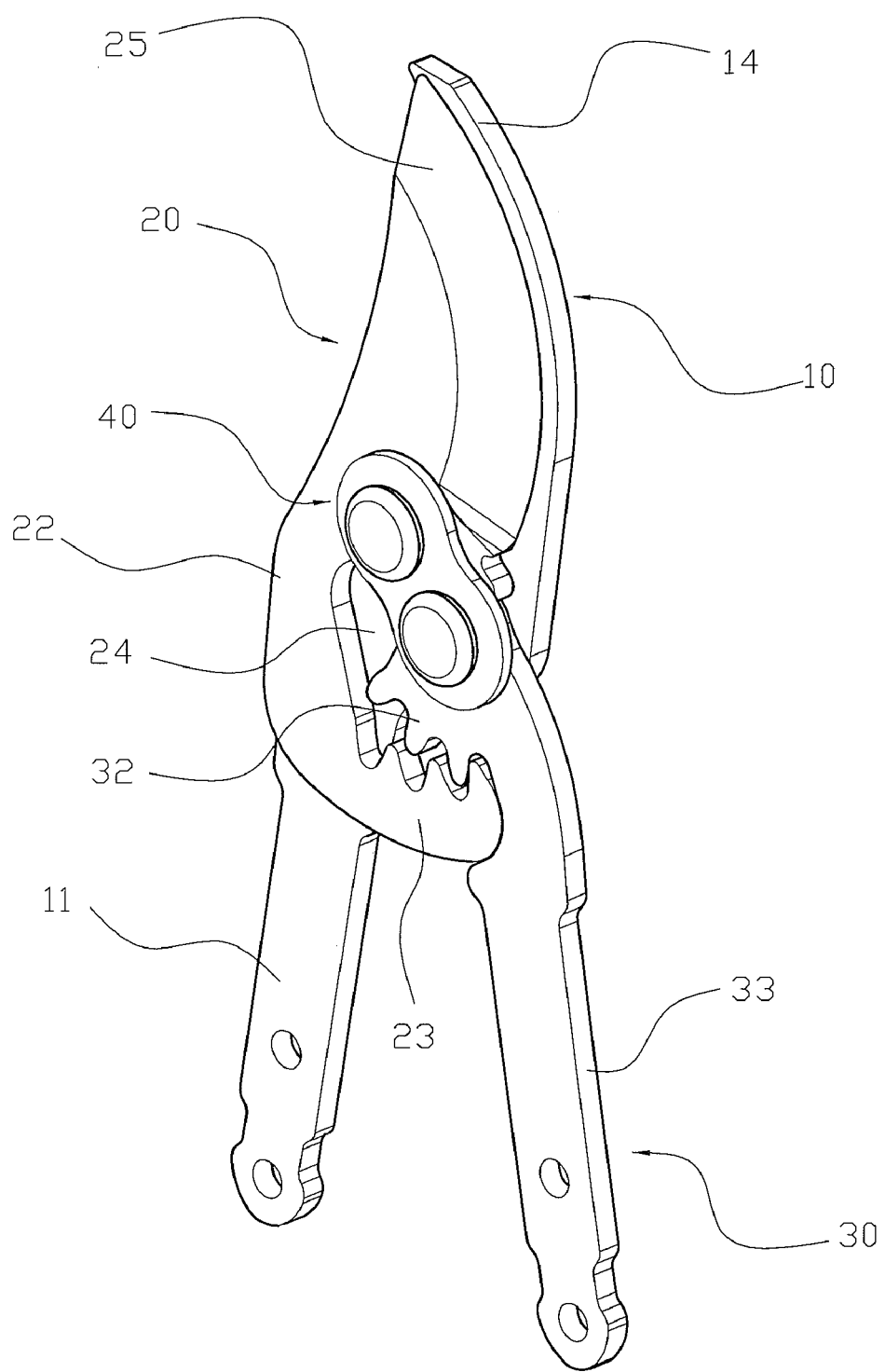
FIG. 8 is a perspective view of a pair of gardening shears in accordance with another preferred embodiment of the present invention.

As shown in FIG. 8, the first cutting portion 14 of the main cutter 10 and the second cutting portion 25 of the secondary cutter 20 have different shapes and types.

Figure 9:
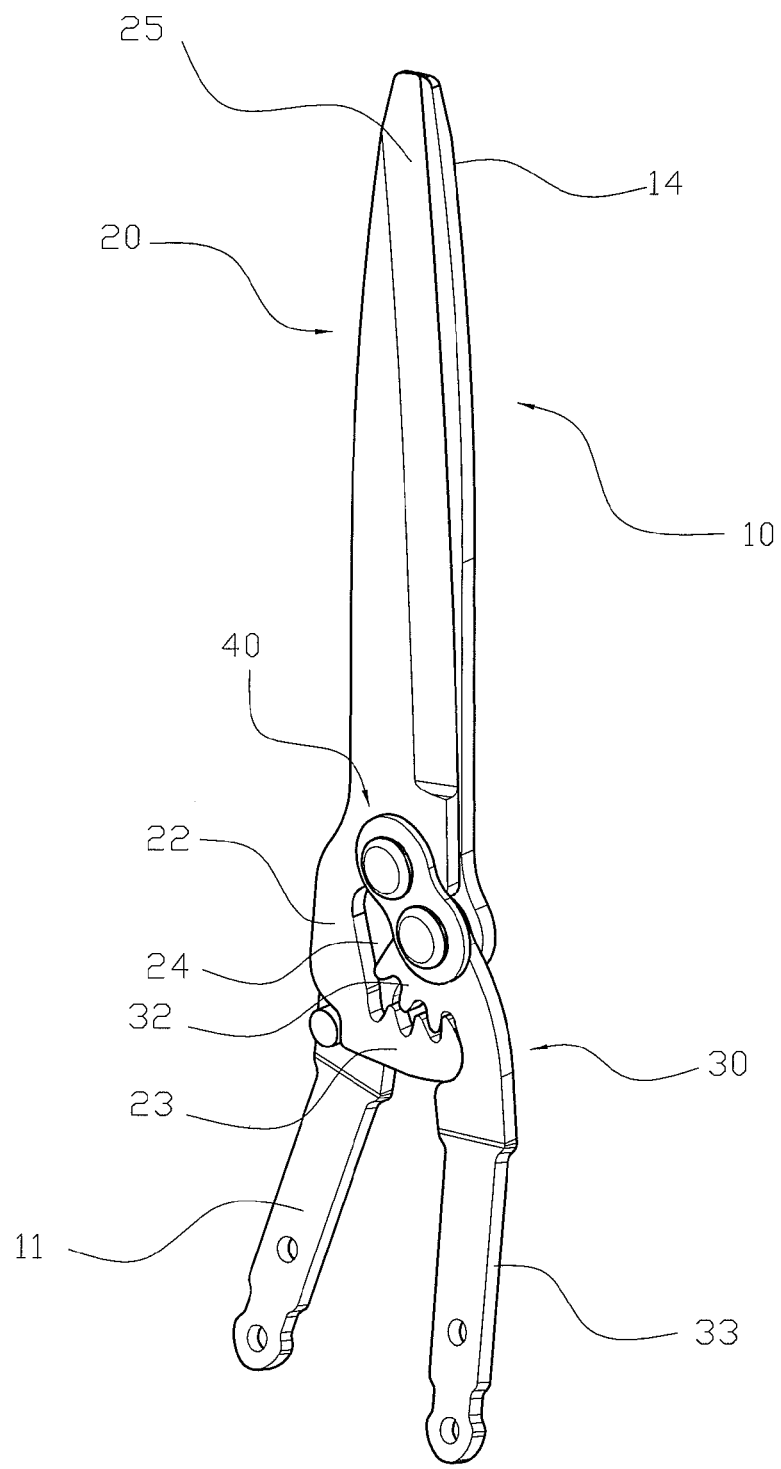
FIG. 9 is a perspective view of a pair of gardening shears in accordance with another preferred embodiment of the present invention.

As shown in FIG. 9, the first cutting portion 14 of the main cutter 10 is a blade, and the second cutting portion 25 of the secondary cutter 20 is also a blade.

Figure 10:
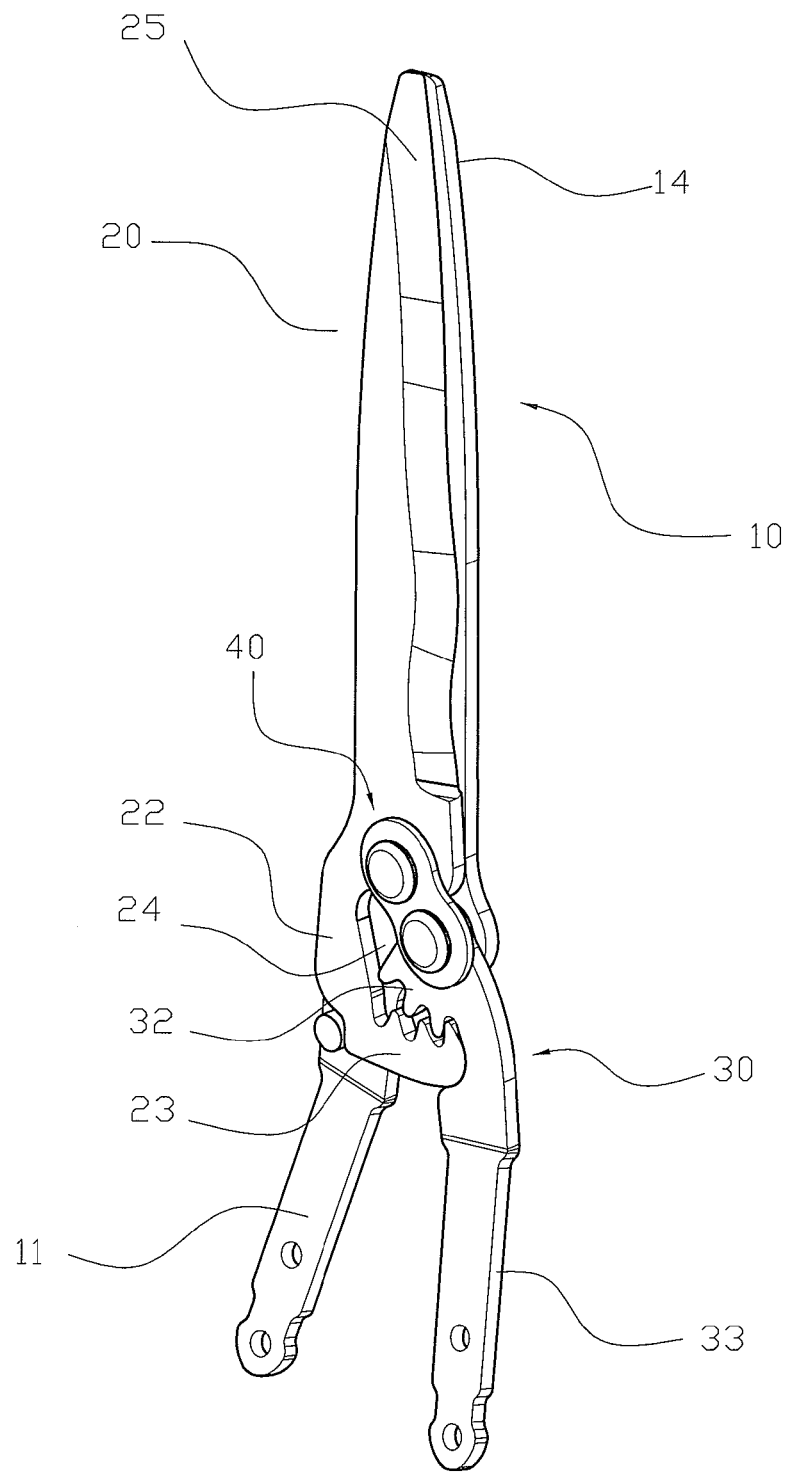
FIG. 10 is a perspective view of a pair of gardening shears in accordance with another preferred embodiment of the present invention.
Figure 11:
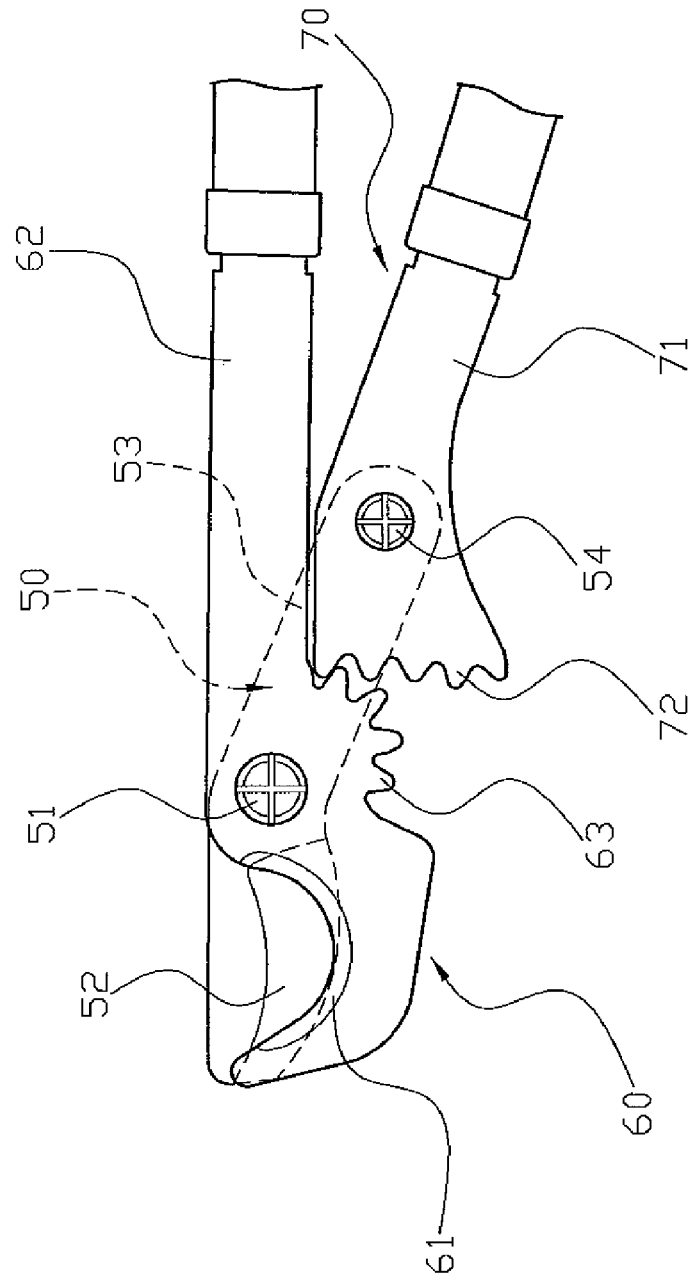
FIG. 11 is a front view of a pair of conventional gardening shears in accordance with the prior art.
Figure 12:
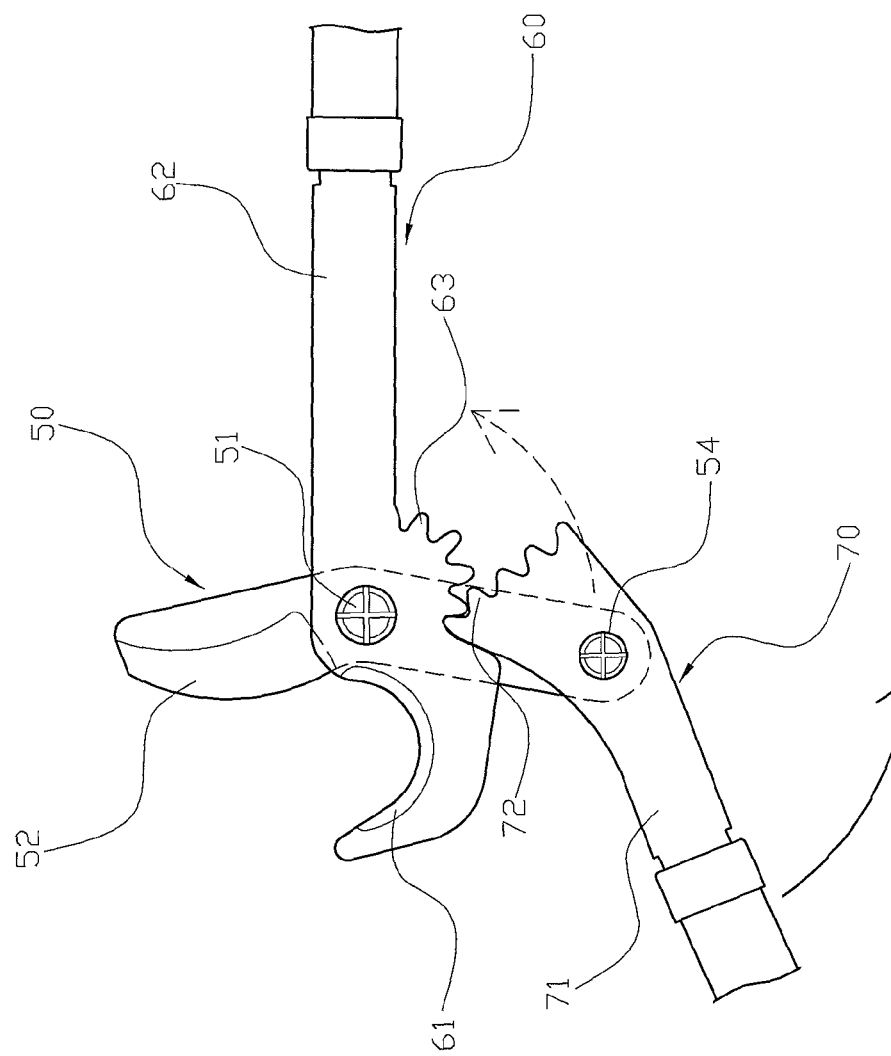
FIG. 12 is a schematic operational view of the conventional gardening shears as shown in FIG. 11.

As shown in FIG. 10, the first cutting portion 14 of the main cutter 10 and the second cutting portion 25 of the secondary cutter 20 have different shapes and types.

Accordingly, the secondary cutter 20 and the force arm 30 are sandwiched between the main cutter 10 and the connecting plate 40 so that the secondary cutter 20 and the force arm 30 are moved smoothly and stably by limit of the main cutter 10 and the connecting plate 40 to facilitate the user performing the pruning action. In addition, the secondary cutter 20 and the force arm 30 are connected by the connecting plate 40 so that when the main cutter 10 and the secondary cutter 20 perform the cutting action, the reaction applied on the main cutter 10 and the secondary cutter 20 is distributed by the force arm 30 evenly to prevent from incurring a stress concentration on the main cutter 10 and the secondary cutter 20 so as to facilitate operation and movement of the main cutter 10 and the secondary cutter 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A pair of gardening shears, comprising:
a main cutter;
a secondary cutter pivotally connected with the main cutter;
a force arm pivotally connected with the main cutter and engaged with the secondary cutter to drive the secondary cutter to pivot relative to the main cutter; and
a connecting plate mounted on the secondary cutter and the force arm so that the secondary cutter and the force arm are sandwiched between the main cutter and the connecting plate;

wherein the main cutter has a first end provided with a first handle and a second end provided with a first cutting portion;

the main cutter has a mediate portion provided with a first pivot hole and a first pivot bore;

the secondary cutter has a middle portion provided with a second pivot hole which is pivotally connected with the first pivot hole of the main cutter by a first pivot bolt and a first fastening nut;

the secondary cutter has a first end provided with an elongate extension and a second end provided with a second cutting portion which faces the first cutting portion of the main cutter;

the extension of the secondary cutter has a bent distal end provided with a driven gear portion;

the first end of the secondary cutter has a side provided with a receiving space which is defined between the second pivot hole, the extension and the driven gear portion of the secondary cutter;

the receiving space of the secondary cutter has a substantially U-shaped profile;

the force arm has a first end provided with a second handle which faces the first handle of the main cutter and a second end provided with a second pivot bore which is pivotally connected with the first pivot bore of the main cutter by a second pivot bolt and a second fastening nut;

the second end of the force arm has a side provided with a drive gear portion meshing with the driven gear portion of the secondary cutter so that the secondary cutter is driven by the force arm to pivot relative to the main cutter when the force arm is pivoted relative to the main cutter;

the drive gear portion of the force arm is movable in the receiving space of the secondary cutter;

the connecting plate is a substantially oblong sheet plate abutting the secondary cutter and the force arm so that the secondary cutter and the force arm are connected by the connecting plate;

the connecting plate has a first end provided with a first through hole which is mounted on the first pivot bolt and a second end provided with a second through hole which is mounted on the second pivot bolt;

the first pivot bolt in turn extends through the first through hole of the connecting plate, the second pivot hole of the secondary cutter and the first pivot hole of the main cutter;

the first fastening nut is screwed onto the first pivot bolt;

the secondary cutter is pivotable about the first pivot bolt;

the second pivot bolt in turn extends through the second through hole of the connecting plate, the second pivot bore of the force arm and the first pivot bore of the main cutter;

the second fastening nut is screwed onto the second pivot bolt; and the force arm is pivotable about the second pivot bolt.

2. The gardening shears of claim 1, wherein the Second cutting portion of the secondary cutter is a cutting blade and the first Cutting portion of the main cutter is an anvil.

3. The gardening shears of claim 1, wherein each of the first cutting portion of the main cutter and the second cutting portion of the secondary cutter are cutting blades.

* * * * *